United States Patent [19]

Comfort

[11] 4,218,913

[45] Aug. 26, 1980

[54] APPARATUS FOR INSPECTING PLASTIC CONTAINERS

[75] Inventor: Gary Comfort, Gillett, Pa.

[73] Assignee: Powers Manufacturing, Inc., Elmira, N.Y.

[21] Appl. No.: 29,494

[22] Filed: Apr. 12, 1979

[51] Int. Cl.$^2$ .............................................. G01M 3/32
[52] U.S. Cl. ......................................... 73/45.2; 73/37
[58] Field of Search ............... 73/37, 41, 45, 45.1, 73/45.2, 49.2; 209/591

[56] References Cited

U.S. PATENT DOCUMENTS

| 3,495,441 | 2/1970 | Laub | 73/45.2 |
|---|---|---|---|
| 3,496,761 | 2/1970 | Powers, Jr. | 73/45.2 |
| 3,683,677 | 8/1972 | Harris | 73/49.2 |
| 3,894,424 | 7/1975 | Taylor et al. | 73/49.2 |

*Primary Examiner*—Gerald Goldberg
*Assistant Examiner*—Joseph W. Roskos
*Attorney, Agent, or Firm*—Seidel, Gonda, Goldhammer & Panitch

[57] ABSTRACT

A carriage having dual spindles reciprocates with continuously moving plastic containers. The first spindle pressurizes a container to blow out any dents in the plastic container. The second spindle inspects the container for detection of defects which would cause the container to be a leaker.

5 Claims, 4 Drawing Figures

APPARATUS FOR INSPECTING PLASTIC CONTAINERS

BACKGROUND

This invention is an improvement over the apparatus disclosed in U.S. Pat. No. 3,496,761. If a plastic container having a dent in a side wall thereof were tested on the apparatus in said patent, the apparatus would reject the container as being defective. Many plastic containers having a dent in the side wall are not defective containers. The inspection apparatus of the present invention has dual spindles instead of a single spindle as disclosed in said patent. One of the dual spindles pressurizes a container before it is tested to thereby blow out any dents in the container whereby a container will not be rejected as being defective merely because there is a dent in the side wall.

SUMMARY OF THE INVENTION

The apparatus of the present invention is structurally interrelated for inspecting plastic containers. The apparatus includes a frame which supports a conveyor for conveying plastic containers to be inspected. A carriage is supported by the frame at an elevation above the elevation of the conveyor. A motor means is provided for reciprocating the carriage parallel to the conveyor and in synchronization therewith. First and second spindles are supported by the carriage for movement toward and away from the conveyor.

The first spindle is upstream from the second spindle. Means including an air injection head on the lower end of the first spindle are provided for sealing contact with the open end of a container and for introducing pressurized air into the container at sufficient pressure to blow out any dents in the container. Means including a head connected to the lower end of said second spindle are provided for pneumatically testing the container for leakage after the container has been processed by the first spindle and means are provided for causing the spindles to move toward and away from the conveyor.

It is an object of the present invention to provide inspection apparatus which will not reject a plastic container due to a dent in the container wall unless the container is otherwise defective.

It is an object of the present invention to provide inspection apparatus which will internally pressurize containers to blow out any dents in the containers before the containers are tested to see if they will leak.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
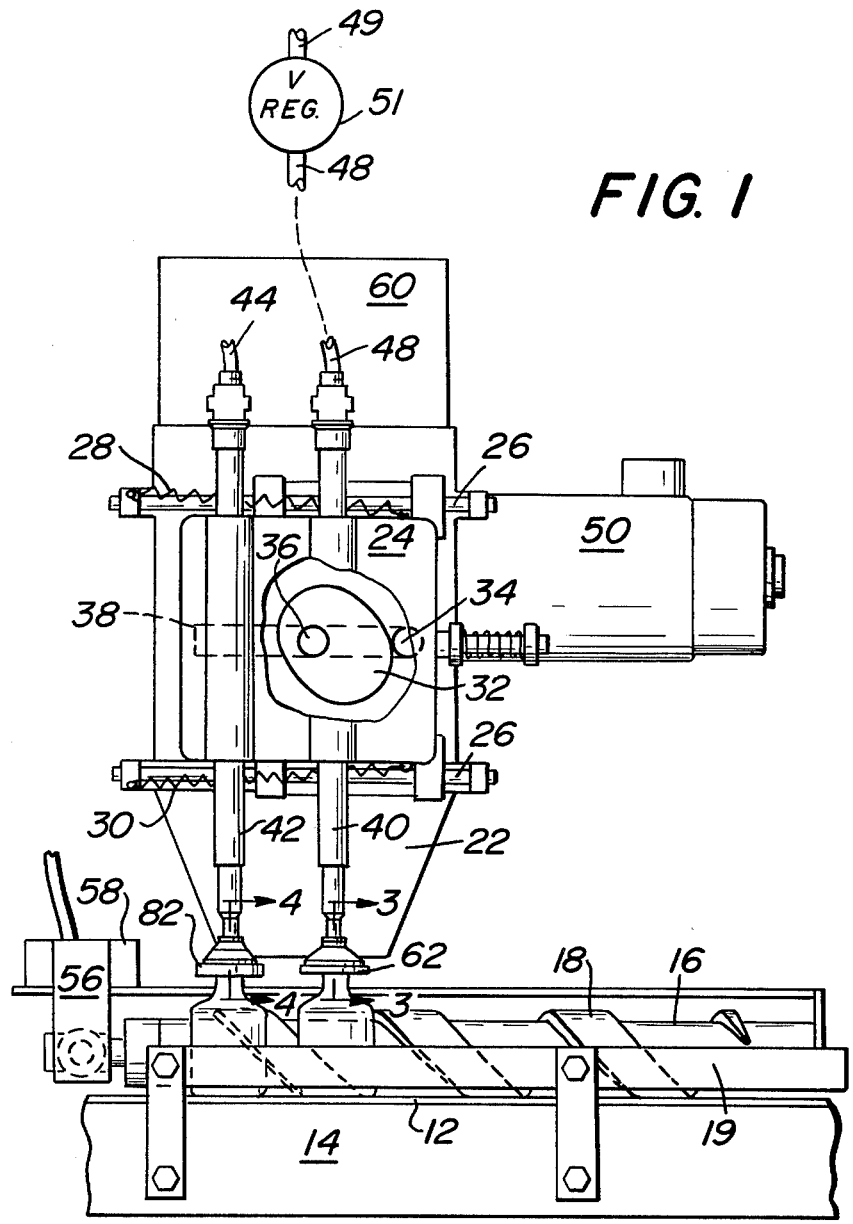
FIG. 1 is a front elevation view of apparatus in accordance with the present invention.

Referring to the drawings in detail, wherein like numerals indicate like elements, there is shown apparatus in accordance with the present invention designated generally as 10. The apparatus 10 is designed to inspect plastic containers and detect leakers. Leakers are defined as containers having body holes or surface flaws at the rim thereof. At the same time, the apparatus 10 is designed so as not to reject plastic containers which are dented and which heretofore caused the apparatus to reject them as being a leaker. As will be made clear hereinafter, the apparatus 10 subjects the plastic containers to pressure sufficient to blow out any dents in the container before the container is inspected to ascertain whether or not it is a leaker.

A major portion of the apparatus 10 is identical with that disclosed in U.S. Pat. No. 3,496,761. The disclosure in said patent is incorporated herein by reference.

Plastic containers to be inspected are transported to the inspection station by way of a conveyor 12 mounted on a support 14. Conveyor 12 is an endless conveyor and only the top run is shown. At the testing area, the containers are traversed through the testing area at uniform speed and in accurately spaced relationship by means of a conveyor having a rotating cylinder 16. Cylinder 16 has a spiral thread 18 of appropriate pitch to receive and transverse the containers as they are held against a spring mounted guide rail 19.

A fixed frame 20 supports a plate 22 in an upright disposition above the elevation of the conveyor 12. The plate 22 supports a carriage 24. Carriage 24 is guided for reciprocatory movement parallel to the movement of the conveyor 12 by means of guides 26 on the plate 22. Springs 28 and 30 bias the carriage 24 in the direction of movement of the plastic containers, namely from right to left in FIG. 1.

A cam 32 is mounted on the end of a shaft which is supported plate 22. The cam 32 projects into the interior of the carriage 24. A cam follower 34 on the carriage 24 is in contact with the periphery of cam 32. Rotation of cam 32 causes the carriage 24 to reciprocate on the guides 26. The contour of the cam 32 during the forward travel of the carriage 24 is such whereby equal angular displacements of the cam cause equal linear displacements of the carriage 24. As will be described in greater detail hereinafter, the cylinder 16 is rotated in a manner such that the same linear displacement of the containers is attained as they pass through the test area.

On a front face of the cam 32, there is provided a roller 36. The roller 36 extends into a horizontally disposed channel on a yoke 38. The yoke 38 is connected to each of the spindles 40 and 42. Hence, as the cam 32 reciprocates the carriage 24, it causes the spindles 40 and 42 to move in a vertical direction toward or away from the conveyor 12.

Figure 2:
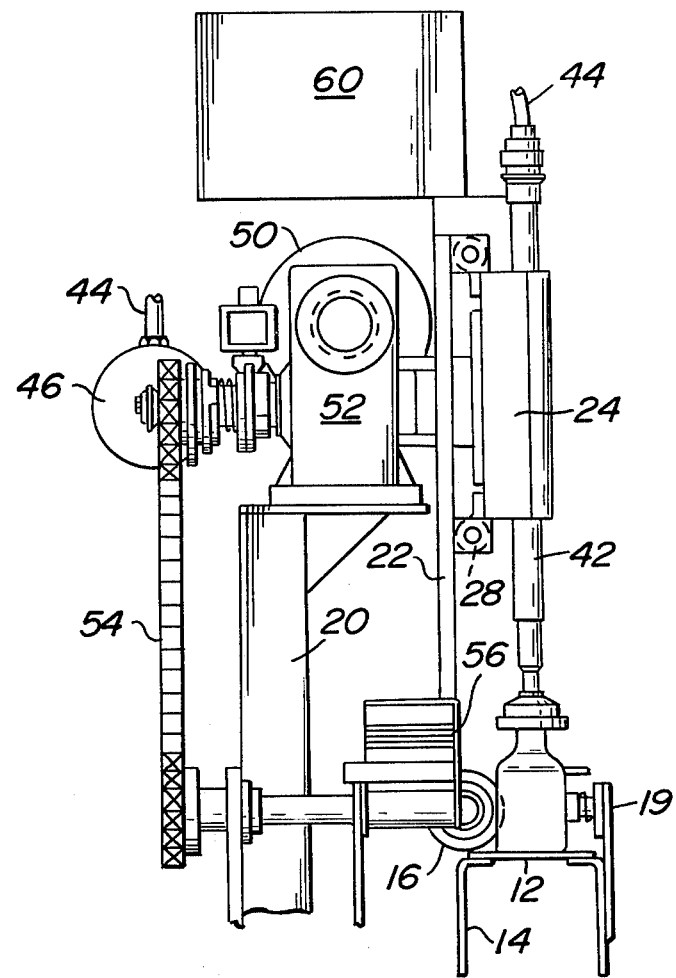
FIG. 2 is an end view of the apparatus shown in FIG. 1.

The spindle 42 at its upper end is connected to one end of a flexible hose 44. The other end of flexible hose 44 is connected to a pump 46. See FIG. 2. The upper end of spindle 40 is connected to one end of a flexible hose 48. The other end of flexible hose 48 is connected to a source of pressurized air such as conduit 49 containing pressure regulator 51.

A motor 50 is supported by the frame 20. The output of motor 50 is connected to a speed reducer 52. Speed reducer 52 is connected to the shaft associated with cam 32, and is also connected by way of sprockets and chain 54 to the cylinder 16. Thus, motor 50 rotates cylinder 16 to traverse the plastic containers through the test area, reciprocates the plungers 40 and 42 while reciprocating the carriage 24 to cause the plungers to inspect plastic containers disposed beneath the plungers.

A reject mechanism 56 is operated by way of a solenoid 58 to push defective containers off the conveyor 12 and into a trash receptacle not shown. Solenoid 58 is connected to circuitry within housing 60 and is operated in the same manner as disclosed in the aforementioned U.S. Pat. No. 3,496,761.

Figure 3:
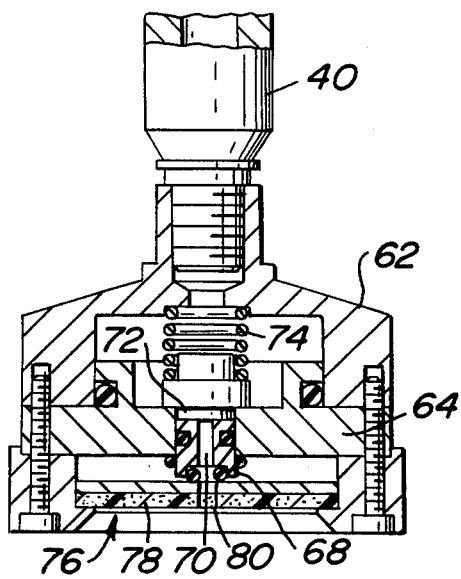
FIG. 3 is a sectional view taken along the line 3—3 in FIG. 1 but on an enlarged scale.

A head 62 is threaded coupled to the lower end of the spindle 40. A valve body 64 is disposed within the head 62 and sealed with respect to the same by way of an O ring or the like. A valve member 68 is mounted within the valve body 64 and sealed with respect to the same by O rings or the like. The valve member 68 has an axial flow passage 70 which communicates with the traverse flow passage 72. A spring 74 biases a peripheral flange on member 68 into contact with the valve body 64. In the position shown in FIG. 3, the valve member 68 is in a closed position.

An actuator 76 is mounted for vertical movement below the valve member 68. The actuator 76 includes a metal disk having a sponge rubber layer 78 on its bottom surface. The actuator 76 has a flow passage 80 coaxial with passage 70 in the valve member 68.

Figure 4:
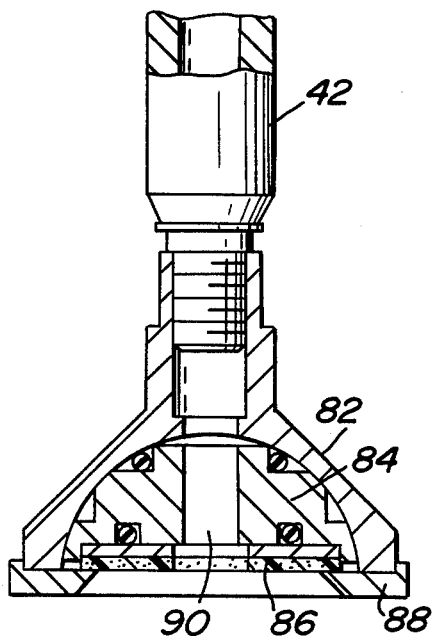
FIG. 4 is a sectional view taken along the line 4—4 in FIG. 1 but on an enlarged scale.

As shown more clearly in FIG. 4, a head 82 is threadedly connected to the lower end of spindle 42. Within the head 82, there is provided a generally spherical fitting 84 in sealing contact therewith. Fitting 84 has a layer of sponge rubber or the like 86 on its lowermost surface and is retained within the head 82 by way of a retainer 88. Retainer 88 is threaded to the head or snap fitted thereon. An axial flow passage 90 is provided in the fitting 84 in direct communication with the interior of spindle 42. Thus, the head 82 does not contain a valve.

The remainder of the apparatus 10 may be identical with that disclosed in the above-mentioned U.S. patent and therefore need not be described in detail herein.

The preferred method of operation of the apparatus 10 is as follows. The empty plastic containers are conveyed to the test station by way of the conveyor 12. The cylinder 16 moves the containers one at a time and precisely displaces the containers. Due to the interrelationship between the yoke 38 and the roller 36 on cam 32, rotation of cam 32 by the motor 50 moves the spindles 40 and 42 downwardly in unison. Each container is first contacted by the head 62 and then by the head 82. When the spindle 40 descends, the layer 78 contacts the rim of the container and pushes the valve member 68 upwardly so as to permit pressurized air at a pressure of about 5 to 10 psi to be introduced into the container. Air at such pressure is sufficient to blow out any dents in small thin walled plastic containers. Carriage 24 moves in synchronization with movement of the containers. Immediately after the container is pressurized by air introduced from spindle 40, the carriage is returned to its initial position by the cam 32 while at the same time elevating the spindles 40, 42. Thereafter, the spindles 40, 42 immediately descend. The container which was previously contacted by head 62 is now contacted by head 82. As soon as layer 86 contacts the rim of the container, a predetermined volume of air is introduced into the container by way of pump 46, conduit 44, spindle 42 and head 82. The air pressure retained in the container is gauged to determine whether any excess leakage escapes due to holes in the container or imperfections in the lip of the container.

The sequence of events is repeated. If a defective container is detected, the container is moved off the conveyor 12 by way of the reject mechanism 56. If the container has a dent in it, it will not show up as a reject since the dent will have been blown out by the air from the spindle 40. Valve 68 is closed at all times except when actuator 76 is forced upwardly due to contact with the rim of a container.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for inspecting plastic containers comprising a conveyor for conveying plastic containers to be inspected at a test station, a carriage supported by a frame at an elevation above the elevation of the conveyor at the test station, motor means for reciprocating said carriage parallel to said conveyor and in synchronization with the displacement of the container, first and second spindles supported by said carriage for movement toward and away from the elevation of said conveyor, said first spindle being upstream from said second spindle, means including an air injection head on the lower end of the first spindle for attaining sealing contact with the rim of a container and for introducing pressurized air into the container at sufficient pressure to blow out any dents in the container, means including a head connected to the lower end of a second spindle for pneumatically testing a container for leakage after the container has been processed by the first spindle, and means for moving said spindles in unison with respect to said carriage in a direction toward and away from the elevation of said conveyor.

2. Apparatus in accordance with claim 1 wherein said first spindle head contains a valve, said valve having an actuator responsive to contact with the rim of the container.

3. Apparatus in accordance with claim 1 including means for discharging a predetermined volume of air from said second spindle head, and said first spindle being connected at its upper end to a flexible hose adapted to be connected to a source of pressurized air.

4. Apparatus for inspecting plastic containers comprising a carriage supported by a frame at a test station, motor means for reciprocating said carriage horizontally, first and second devices supported by said carriage for movement vertically, said first device being upstream from said second device, means including an air injection head on the lower end of the first device for introducing pressurized air into a moving container at sufficient pressure to blow out any dents in the container, means connected to the lower end of a second device for testing a moving container for leakage after the container has been processed by the first device.

5. Apparatus in accordance with claim 4 wherein said first device contains a valve having an actuator responsive to contact with the rim of the container.

* * * * *